United States Patent
Prater et al.

[11] Patent Number: 6,151,198
[45] Date of Patent: Nov. 21, 2000

[54] OVERMOLDING OF ACTUATOR E-BLOCK BY THIXOTROPIC OR SEMISOLID FORGING

[75] Inventors: Walter Lloyd Prater; Gwendolyn Jones Chung; Tim Raeburn Lincoln, all of San Jose, Calif.

[73] Assignee: International Business Machines Corporation, Armonk, N.Y.

[21] Appl. No.: 09/193,879

[22] Filed: Nov. 18, 1998

[51] Int. Cl.[7] .................... G11B 5/54; C22F 1/04; B22F 9/00; B22D 11/00

[52] U.S. Cl. .................. 360/265.7; 148/549; 75/249; 164/477

[58] Field of Search .................... 360/104–106, 360/265.7; 148/549, 514; 75/249, 250; 164/57.1, 477

[56] References Cited

U.S. PATENT DOCUMENTS

| | | | |
|---|---|---|---|
| 4,906,518 | 3/1990 | Inabata | 428/218 |
| 4,941,918 | 7/1990 | Horikoshi et al. | 75/229 |
| 5,260,847 | 11/1993 | Basehore et al. | 360/106 |
| 5,501,266 | 3/1996 | Wang et al. | 164/113 |
| 5,551,997 | 9/1996 | Marder et al. | 148/437 |
| 5,627,701 | 5/1997 | Misso et al. | 360/106 |
| 5,650,896 | 7/1997 | Viskochil | 360/106 |
| 5,654,849 | 8/1997 | Hassibi et al. | 360/98.07 |
| 5,656,877 | 8/1997 | Loubier | 310/13 |
| 5,672,435 | 9/1997 | Born et al. | 428/539.5 |
| 5,679,182 | 10/1997 | Marder et al. | 148/665 |
| 5,716,467 | 2/1998 | Marder et al. | 148/549 |
| 5,796,554 | 8/1998 | Berding et al. | 360/104 |

OTHER PUBLICATIONS

RD 425065A; Derwent # 1999–559657; IBM; "Actuator E–block . . . Made From . . . Metal Matrix", Sep. 1999.

"Semi–Solid Forming of Aluminum and Magnesium"; Jun. 1996; Nussbaum.

*Primary Examiner*—Jefferson Evans
*Attorney, Agent, or Firm*—Douglas R. Millett; Felsman, Bradley, Vaden, Gunter & Dillon, LLP

[57] ABSTRACT

An actuator E-block for a rotary data storage device has a number of solid flat arms and flat coil yokes. The arms and yokes are formed from a metal, metal-reinforced metal matrix composites (MMC), ceramic-reinforced MMCs, glasses, ceramics or ceramic composites having a low density metal matrix surrounding reinforcing particles of low density and high specific stiffness. The arms and yokes may be formed as inserts by inexpensive processes such as stamping, blanking or laser scribing. The arm and yoke inserts are placed in a mold and then overmolded with a metal or metal matrix composite E-block body using a thixotropic or semisolid forming process. After molding, these materials and processes form a cost effective, light-weight E-block with a near net shape and enhanced damping and stiffness.

24 Claims, 3 Drawing Sheets

OVERMOLDING OF ACTUATOR E-BLOCK BY THIXOTROPIC OR SEMISOLID FORGING

TECHNICAL FIELD

This invention relates in general to rotary data storage devices and in particular to the manufacturing of actuator E-blocks for hard disk drives or other rotary storage devices.

BACKGROUND ART

Thixotropic metal forming processes may be used to either make a raw material or fabricate a finished part. These processes are also known as thixocasting, thixomolding, thixoforming, semi-solid forming, semi-solid forging, semi-solid casting, semi-solid metal processing or rheocasting. Thixotropic metal forming is based on a discovery made by Professor M. C. Flemings during research on hot tearing undertaken at MIT in the early 1970s. Seeking to understand the magnitude of the forces involved in deforming and fragmenting dendritic growth structures, MIT researchers constructed a high-temperature viscometer. They poured model lead-tin alloys into the annular space created by two concentric cylinders and measured the forces transmitted throughout the freezing alloy when the outer cylinder was rotated.

During the course of these experiments, it was discovered that when the outer cylinder was continuously rotated the semi-solid alloy exhibited remarkably low shear strength even at relatively high fractions solidified. The unique property was attributed to a novel nondendritic, spheroidal microstructure. The MIT researchers were quick to identify several potential benefits that could result from forming processes utilizing semi-solid metal and that would differentiate these processes from conventional casting. First, and particularly significant for higher melting alloys, semi-solid metalworking afforded lower operating temperatures and reduced metal heat content (reduced enthalpy of fusion). Second, the viscous flow behavior could provide for a more laminar cavity fill than could generally be achieved with liquid alloys. This could lead to reduced gas entrainment. Third, solidification shrinkage would be reduced in direct proportion to the fraction solidified within the semi-solid alloy, which should reduce both shrinkage porosity and the tendency toward hot tearing.

Raw material for semi-solid forming part production requires the special microstructure. When semi-solid, this structure is comprised of solid particles in the form of spheroids or globules suspended in a matrix of lower melting alloy liquid. Recapturing this structure in materials heated from the solid state requires the retention of some residual microsegregation to provide differential melting between solid and liquid phases. In the disk drive actuator art, practitioners have proposed numerous incremental improvements to the actuator assembly design typified by actuator assembly 10 in FIG. 1. For instance, in U.S. Pat. No. 5,122,703, Fumihiko Takahashi et al. teach an improvement in joining coil 22 to E-block 12 that consists of fixing the two together by a hold member made of a thermal plastic resin having an elastic modulus greater than a specified value. In U.S. Pat. No. 5,148,071, Takahashi teaches the use of a nonconductive stiffening plate disposed over coil 22, with both coil and plate integrally molded (over-molded) to E-block 12. Both Takahashi inventions teach solutions to the coil-block joint flexure problem known to cause head tracking errors.

Similarly, in U.S. Pat. No. 5,168,184, Teruo Umehara et al. disclose a swing-actuator assembly that uses a plastic molded hold member no thicker than the coil element to connect coil and block, thereby reducing rotational inertia without losing the desired rigidity of the coil-block joint. In U.S. Pat. No. 5,168,185, Umehara et al. address the related problem of disk drive contamination caused by "flash formation" during encapsulation (over-molding) of the actuator arm assembly. Umehara et al. show how to use a diluted epoxy coating over the encapsulated swing-type actuator to prevent shedding of injection-mold plastic particles (flashes). Takahashi et al. and Umehara et al. consider only the coil-block joint rigidity issues relating to coil 22 and E-block 12 in FIG. 1.

In U.S. Pat. No. 5,382,851, Robert Loubier discloses a different swing-type actuator of the type exemplified by the actuator 26 in FIG. 2. Actuator 26 reduces rotational inertia by encapsulating a coil carrier 30 and individual metallic actuator arms exemplified by the actuator arm 28 into a central plastic body 32, thereby eliminating the heavy central body 46 (FIG. 1) of the E-block known in the art. Loubier's invention introduces several new disadvantages. The coil-block joint problem known in the art is exacerbated because most of the central portion 46 of the E-block is replaced with plastic, thereby perhaps introducing more flexibility in the alignment between coil carrier 22 and actuator arm plurality 48. Also, pivot-axis runout is increased because of increased flexibility at the inner surface of the bore hole 40. Loubier does not consider solutions to this problem beyond merely drilling into plastic pivot body 32 a bore hole 40 to accept an unspecified cartridge bearing assembly. Loubier considers no means for rigidly attaching his cartridge bearing assembly (not shown) to his molded plastic body 32.

The introduction into non-conductive plastic body 32 of individual conductive actuator arms exemplified by actuator arm 28 creates a static charge problem that is not known for monolithic metallic E-block actuator assemblies. Loubier resolves this problem by using a press-fit conductive pin 42 inserted through a series of precisely-aligned holes in the actuator arm plurality 48, as shown in FIG. 3. One end of conductive pin 42 is then coupled to a ground potential in some manner. The precise alignment of the actuator arm plurality 48 needed for insertion of grounding pin 42 requires jigging or drilling steps additional to those steps required for actuator fabrication using a monolithic aluminum block. He also suggests coupling arm plurality 48 through conductive pivot journal 38 at the edges exemplified by edge 44 (FIG. 3), or by means of a conductive plastic filler (not shown) contacting actuator arm plurality 48 in body 32. Although each of these techniques resolves the static charge accumulation problem, all introduce some particular new fabrication steps, thereby increasing manufacturing cost. Other examples of prior art actuators include those shown in U.S. Pat. No. 4,985,652 to Oudet, et al. and U.S. Pat. No. 4,916,456 to Manzke, et al.

In some swing-type actuator embodiments, the arm is constructed from metal such as aluminum. Metal arms have several advantages, including the ability to more readily and securely attach read/write heads to the arm, the ability to maintain exacting tolerances for the arm, and the relative ability to more easily machine features into the arm. The coil is typically attached to metal arms by means of screws, similar fasteners or adhesives. However, for various reasons, including ease of manufacturing, it has been found desirable to secure the coil to the arm by injection molding thermoplastic material around a portion of the coil and a portion of the arm. Examples of such actuators include U.S. Pat. No. 5,122,703 to Takahashi, al., as well as numerous earlier actuators manufactured by the assignee of the present application.

Although the above-described actuators are all acceptable for their intended uses, they do have certain undesirable features. For example, an aluminum E-block can be relatively expensive to manufacture. Additionally, it may be desirable to provide an actuator having a lower overall weight than one utilizing an aluminum E-block, thereby reducing inertia and momentum and the attendant forces necessary to move and stop the actuator. Accordingly, all-plastic actuators have been proposed. In such actuators, the coil is placed in a mold and the actuator arm is simultaneously formed from a thermoplastic material and molded to the coil. Examples of such actuators include U.S. Pat. No. 5,165,090 to Takahashi, et al., as well as earlier actuators manufactured by the assignee of the present application.

Embodiments of the invention in U.S. Pat. No. 5,654,844 solve two of the previously stated problems. The static accumulation problem is resolved by adding a spring-loaded grounding element that eliminates all fabrication steps associated with a conductive filler, a molded metallic journal or a carefully-aligned press-fit conductive element. This design ensures rigid coupling of the plastic actuator body to a pivot axis without fasteners or metallic journals molded into the plastic body. The spring-loaded ground conductor element adds part cost and assembly complexity. The press-fit pivot element of this design may degrade E-block journal dimensional accuracy during manufacturing rework steps where a defective first pivot is pressed out and replaced by a second pivot into a now deformed journal. This could degrade actuator tracking performance and reliability while increasing plastic actuator manufacturing cost.

Without solutions for these and other disadvantages of the molded plastic actuator assembly know in the art, practitioners are obliged to accept unwanted new fabrication costs to obtain a desired reduction in rotational inertia. Certain of these unresolved problems and deficiencies are clearly felt in the art and are solved by this invention in the manner described below.

DISCLOSURE OF THE INVENTION

An actuator E-block for a hard disk drive has a number of solid flat arms and flat coil yokes. In this invention, the arms and yokes are formed from metal, metal-reinforced metal matrix composites (MMC), ceramic-reinforced MMCs, glasses, ceramics or ceramic composites. MMCs are composed of a low density metal matrix surrounding reinforcing particles of low density and high specific stiffness. The arms and yokes may be formed as inserts by inexpensive processes such as stamping, blanking or laser scribing. The arm and yoke inserts are placed in a mold and then overmoled with a metal or metal matrix composite forming the E-block body using a thixotropic metal forming process. After molding, these materials and processes form an E-block with a near net shape, low rotational inertia, enhanced damping and high stiffness.

Accordingly, it is an object of the present invention to provide an improved swing-type actuator for carrying a read/write head.

Another object of the present invention is the provision of a swing-type actuator that is lightweight, stiff, damped and durable.

Yet another object of the present invention is the provision of a swing-type actuator that can receive a pivot bearing and provide a solid mounting surface for it.

Still another object of the present invention is the provision of a swing-type actuator having an arm capable of being machined to include desired features.

It is another object of this invention to improve actuator performance without increasing actuator inertia. It is an advantage of this invention that it provides a disk drive actuator assembly that is capable of more precise head positioning control that the low inertia molded plastic actuators or the monolithic cast or extruded metal actuators known in the art.

It is another object of this invention to reduce fabrication complexity and cost.

Another advantage of this invention is to provide a near-net-shape E-block that is less expensive to fabricate than the monolithic cast or extruded metal E-blocks known in the art.

These and other objects of the present invention are attained by the provision of a swing-type actuator which comprises a coil yoke, at least one arm formed of a stiff, low density material having a first and second end, and a thixotropically formed metal or metal matrix composite body which includes a journal disposed between the first end of the arm and the coil. The body is thixotropically formed about a portion of the first end of the arm and at least a portion of the coil yoke so as to secure the arm and coil yoke to the body.

An advantage of the present invention is to provide actuator arms that are stiffer than the traditional aluminum or magnesium arms.

An advantage of the present invention is to provide an E-block body that is stiffer than the plastic overmolded bodies.

An advantage of the present invention is to provide an E-block body that is electrically conductive and does not require the grounding pins and other configurations used in the known art to manufacture the plastic overmolded bodies.

An advantage of the present invention is better dimensional stability due to reduced thermal strain and distortion in the arm and coil yoke, from the lower shrinkage rates of the thixotropically formed body than the higher shrinkage rate of plastic overmolded bodies.

Another advantage of the present invention is to reduce thermally induced off-track performance of the read/write head because the metal or MMC produce an actuator body that better matches the thermal coefficient of expansion (CTE) of the spindle motor hub, spacer rings and disks compared to the larger CTE of a plastic body.

Yet another advantage of the present invention is better joint stability at the body-to-arm and body-to-coil yoke interfaces during disk drive operational temperature swings compared to plastic molded bodies.

BEST MODE FOR CARRYING OUT THE INVENTION

Figure 1:
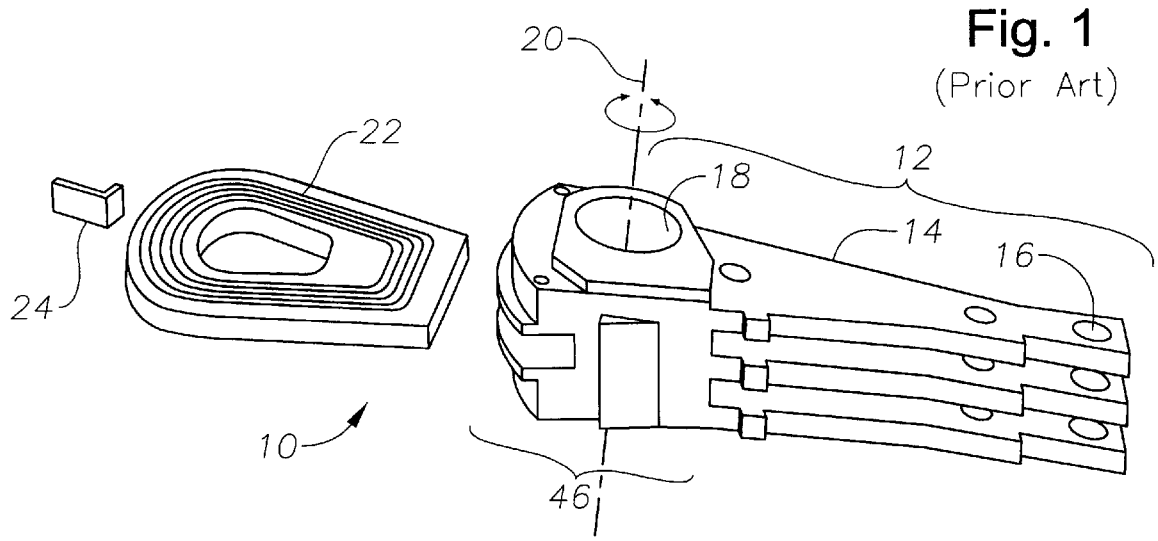
FIG. 1 is an isometric view depicting a common disk drive actuator from the prior art.
Figure 2:
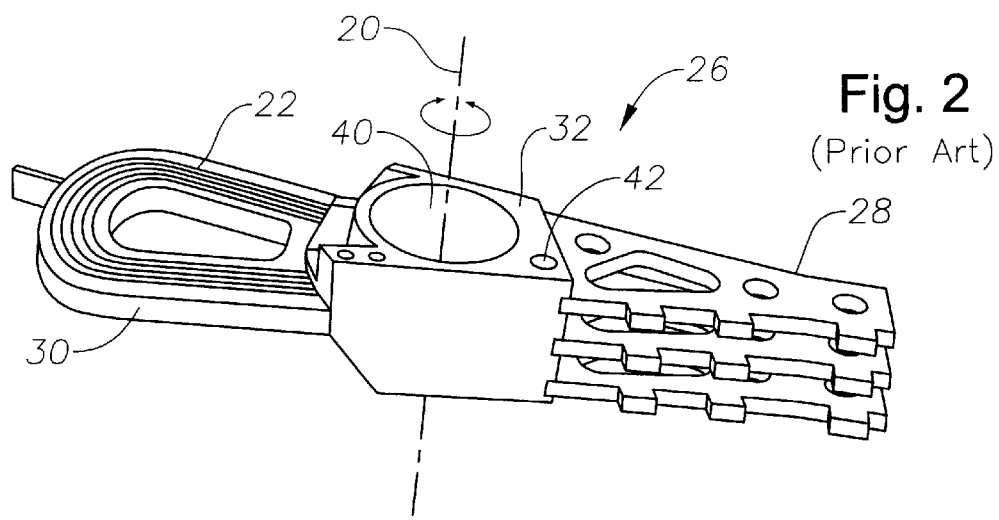
FIG. 2 is an isometric view of a low inertia disk actuator from the prior art.
Figure 3:
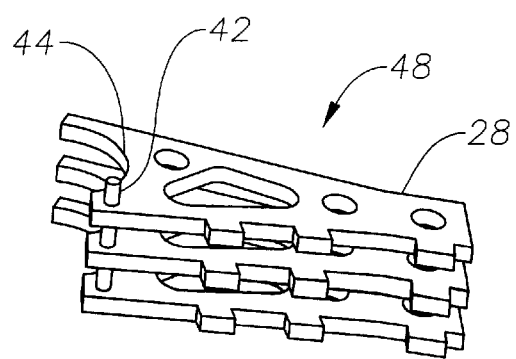
FIG. 3 is an isometric view of actuator arms from the actuator of FIG. 2 coupled by a press-fit grounding pin from the prior art.
Figure 4:
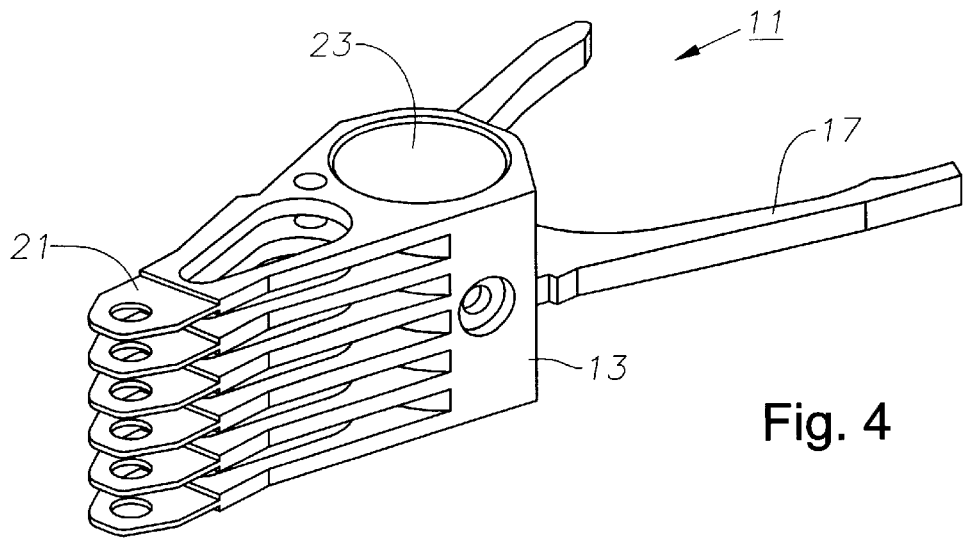
FIG. 4 is an isometric view of an actuator E-block constructed in accordance with the invention.
Figure 5:
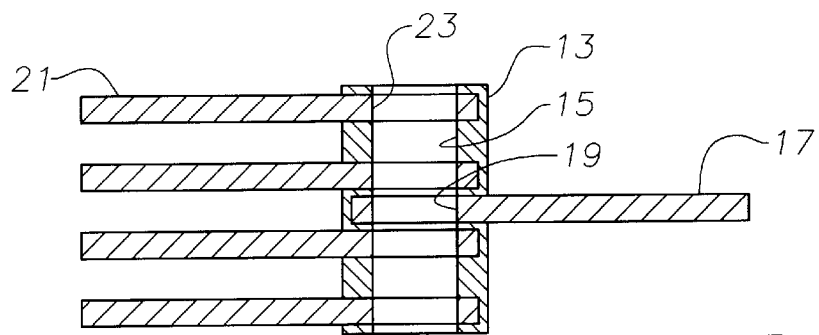
FIG. 5 is a sectional side view of the actuator E-block of FIG. 4.

Referring to FIGS. 4 and 5, an actuator E-block 11 for a hard disk drive is shown. E-block 11 has a generally upright cylindrical body 13 with a central bore 15 (FIG. 5). At least one flat coil yoke 17 extends from one side of body 13. Yoke 17 has a circular hole 19 on one end which is coaxial with bore 15. Yoke 17 is centrally located between upper and lower ends of body 13. E-block 11 also has at least one flat arm 21. In the embodiment shown, a plurality of flat arms 21 extend from an opposite side of body 13. Arms 21 have a circular hole 23 on one end which is coaxial with bore 15 in body 13 and hole 19 in yoke 17. Arms 21 are parallel to one another and to yoke 17, which extends between two adjacent arms 21. Neither yoke 17 nor arms 21 extend completely through body 13.

Yoke 17 and arms 21 may be formed from a variety of metals, alloys, metal matrix composites (MMCs), metal-reinforced MMCs, ceramic-reinforced MMCs, silicon-reinforced MMCs, carbon-reinforced MMCs, glasses, ceramics or ceramic composites. MMCs comprise low density metal matrices which surround reinforcing particles of low density and high specific stiffness. MMCs typically have a metal as the matrix, and a ceramic or a high melting point metal, such as beryllium, as the reinforcement. In the preferred embodiment, low melting temperature metals such as aluminum, magnesium or zinc alloys are used as the matrix. The preferred ceramic reinforcement materials include but are not limited to titanium carbide (TiC), magnesia (MgO), silicon carbide (SiC), silicon nitride (Si3N4), beryllia (BeO), alumina (Al2O3), titanium boride (TiB2), aluminum nitride (AlN) or boron carbide (B4C). Other reinforcements could be silicon, boron, beryllium or carbon fiber.

Figure 6:
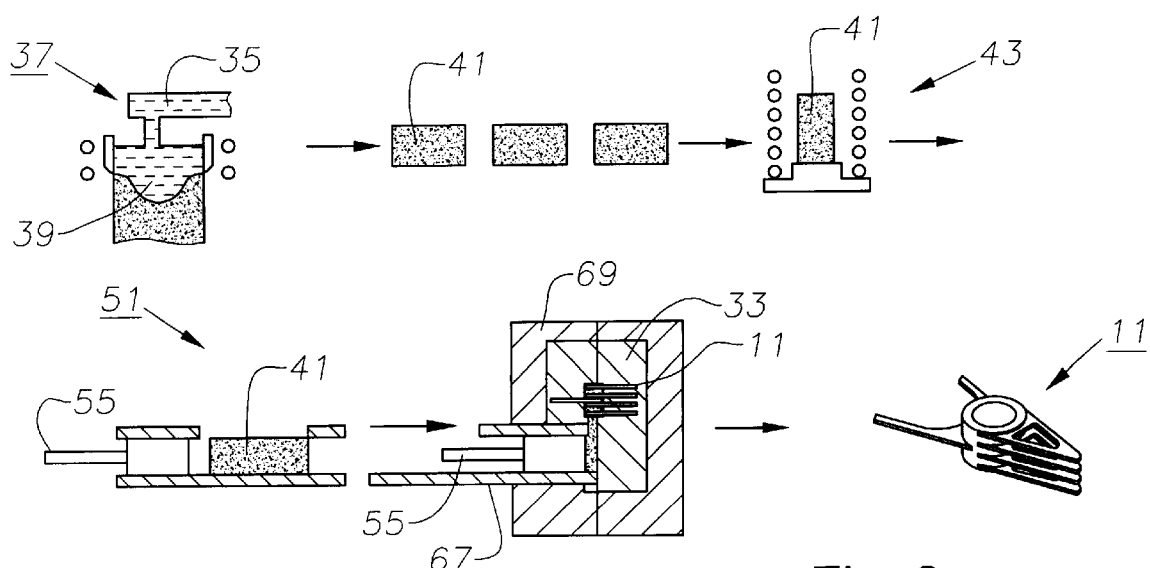
FIG. 6 is a schematic diagram of a semi-solid forging process for constructing the actuator E-block of FIG. 4.
Figure 7:
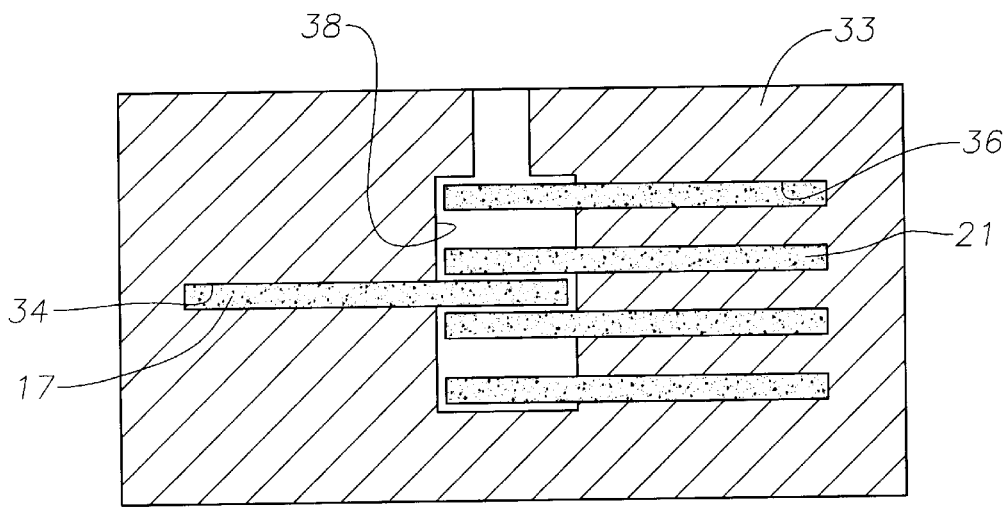
FIG. 7 is a sectional side view of a mold used in the process of FIG. 6 to form the actuator E-block of FIG. 4.

Referring now to FIG. 6, body 13 is formed from a thixotropic material in a thixotropic metal forming process. The process is used to integrate body 13 with yoke 17 and arms 21 to form E-block 11. The process utilizes a die or mold 33 having a plurality of slots 34, 36 (FIG. 7) for closely receiving a prefabricated yoke 17 and prefabricated arms 21, respectively. As will be described in further detail below, body 13 is thixotropically formed around yoke 17 and arms 21 in a cylindrical cavity 38 in mold 33, and cooled slightly prior to removal from mold 33. With this process, body 13 is formed into a near net shape. In this disclosure, the term "near net shape" refers to a molded part which needs very little, if any, additional processing to conform the part to dimensional specification. Body 13 may be formed from commercially available magnesium, aluminum or zinc alloys, or a developmental material such as a beryllium magnesium alloy, a beryllium aluminum alloy, or any of the previously mentioned MMCs. The raw materials for body 13 are prepared as shown in FIG. 6. Once the alloy or MMC 35 for body 13 is selected, it may be melted and cast into billets 39. Billets 39 must show a very fine, isotropic and homogeneous grain structure. The best way to obtain this is to cast using a modified DC casting process 37 in which the liquid is electromagnetically stirred around the axis of symmetry of billet 39 immediately before and during solidification. This very intensive stirring slows down grain growth, mostly by breaking the dendrites which begin to form during solidification. This technique, combined with a good grain refinement, provides the ideal grain morphology which is needed for the further production steps.

Cast billets 39 are rolled and cut into slugs 41. If using powder metallurgy, the materials are blended, hot isostatic pressed, extruded into billets 39 and cut to length to make slugs 41. For thixotropic forming, it is necessary to have the material in a semi-solid/semi-liquid state. Thus, slugs 41 are heated by an inductive heating apparatus 43, such as an induction coil furnace, or other methods. At this point, the metal or metal matrix starts to become liquid, but still supports its own weight. Ideally, slugs 41 are heated to a homogeneous and precise condition with a liquid consistency of approximately 35%. A first, very intensive heating phase (power heating) brings slugs 41 to their solidus temperature. This is followed by a reduced heating phase (homogenization heating). During this latter heating phase, a coarsening of the dendrite arms occurs, which leads to spherical grains.

A robot (not shown) brings the heated slugs 41 to the shot sleeve of an appropriate pressure die casting machine. Under the high shear stresses occurring during mold filling, the viscosity of the thixotropic material is reduced by a factor of approximately 1000 and it flows into the cavity with a viscosity of around 0.1 Pa.s, which corresponds to the viscosity of thick oil. Due to this low viscosity and the defined process parameters, the semi-solid material fills the mold in laminar flow. The solidification time is very short, because only one-third of the material is liquid and also because heat flow into the mold decreases strongly with time. Therefore, the solidification time often lasts only one tenth of the time required in pressure die casting. This has a very important influence on the microstructure and also on the properties of the parts produced. Another consequence of this short solidification time is that the productivity of thixotropic forming is significantly higher than with pressure die casting. During the shot injection, special equipment prevents oxides located on the billet surface from being carried into the shaped part.

Figure 8:
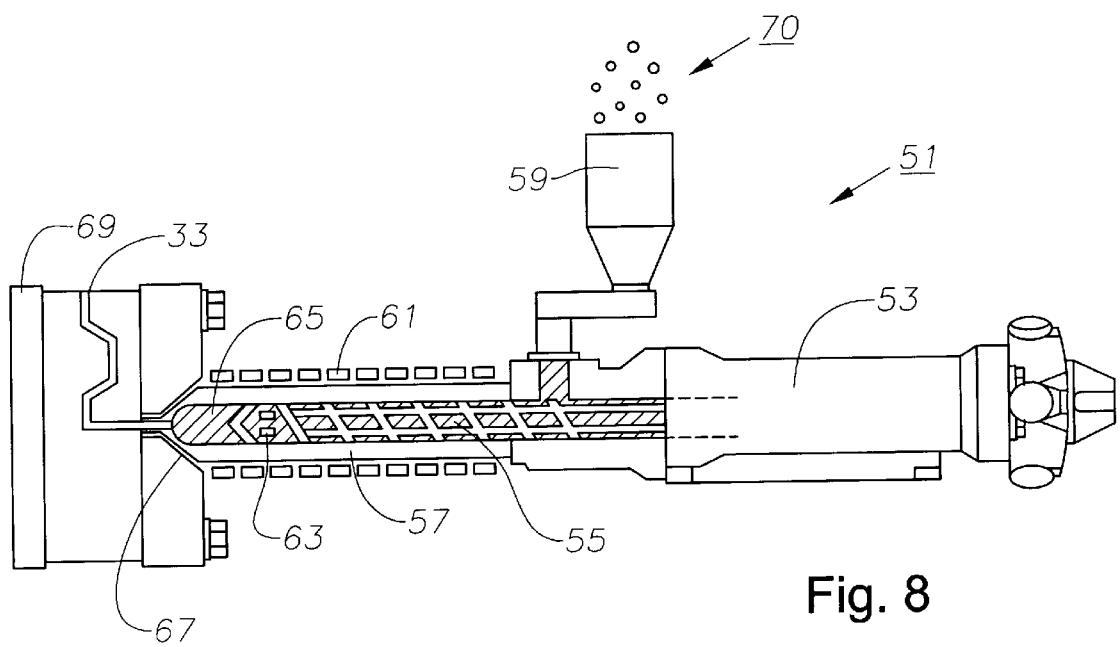
FIG. 8 is a schematic, partial sectional drawing of a machine used in the process of FIG. 6 for thixomolding the actuator E-block of FIG. 4.

An example of this process is shown in FIG. 8. A thixotropic forming machine 51 may be used to process the metal or MMC material of slugs 41 as feedstock 70 for forming body 13 in mold 33. Machine 51 utilizes a rotary drive and shot system 53 which drives a reciprocating screw 55 inside a barrel 57. Slugs 41 may be chopped or powderized and supplied as feedstock 70 through a feeder 59 directly into barrel 57 which is surrounded by inductive band heaters 61 to heat feedstock 70 to the proper semi-solid temperature. The processed semisolid material 70 is forced through a non-return valve 63 and into a shot accumulator 65 before being propelled through a nozzle 67. Nozzle 67 injects semi-solid feedstock 70 into mold 33 which has been preloaded with a preformed yoke 17 and arms 21. The sections of mold 33 are held together by a hydraulic clamp 69. The pressure of being rammed into mold 33 lowers the viscosity of feedstock 70 by a factor of approximately 1000. This allows the molten metal to carry the solid material with it. After rapid cooling, the thixotropically molded part or E-block 11 is ejected from mold 33. Arms 21 and yoke 17 will be molded in place with body 13. Arms 21 and yoke 17 do not reach a melting temperature during this process.

The invention has several significant advantages. The arms and coil yokes of the actuator E-block described herein utilize lightweight materials with high specific stiffness to lower the E-block's rotational moment of inertia, increase its damping ratio and servo bandwidth, decrease disk access times, shorten head settle times, and improve off-track performance. Performance is also improved with regard to thermal stability, chemical inertness, particulate cleanliness and geometric stability. The preferred reinforcing materials used in the arms and coil yokes are approximately two to six times more stiff than 6061 aluminum, which is the conventional E-block extrusion alloy used in arms and coil yokes. The damping properties of MMC are usually better than 6061 aluminum as its internal particle-to-metal interface helps to absorb and scatter vibrational energy. The process utilized to form the E-blocks allows for closer tolerances and lower porosity than conventional die casting. As a result, near net shape parts are created by the process.

While the invention has been shown or described in only some of its forms, it should be apparent to those skilled in the art that it is not so limited, but is susceptible to various changes without departing from the scope of the invention.

What is claimed is:

1. A method for creating an actuator E-block for a hard disk drive, comprising:
   (a) fabricating a yoke and an actuator arm;
   (b) inserting the yoke and the actuator arm into a mold;
   (c) injecting a semi-solid material selected from the group consisting of metal, metal-reinforced metal matrix composite (MMC), ceramic-reinforced MMC and silicon-reinforced MMC into the mold to form an E-block body around portions of the yoke and the actuator arm, thereby creating an actuator E-block; and then
   (d) removing the actuator E-block from the mold.

2. The method of claim 1 wherein step (c) comprises thixotropically forming said material into the mold.

3. The method of claim 1, further comprising the steps of casting the material of step (c) into billets prior to step (c).

4. The method of claim 3, further comprising the step of processing the billets into fine pieces prior to step (c).

5. The method of claim 1 wherein the material of step (c) is formed from powders, blended, hot isostatic pressed, and extruded into billets.

6. The method of claim 5, further comprising the step of processing the billets into fine pieces prior to step (c).

7. The method of claim 1 wherein step (a) comprises forming the yoke and the actuator arm from a solid material selected from the group consisting of metal, metal-reinforced metal matrix composite (MMC), ceramic-reinforced MMC, silicon-reinforced MMC, carbon-reinforced MMC, glass, ceramic, and ceramic composite.

8. The method of claim 1 wherein step (a) comprises forming the yoke and the actuator arm from a solid metal alloy having a reinforcement material, the metal alloy being selected from the group consisting of aluminum, magnesium and zinc, and the reinforcement material being selected from the group consisting of titanium carbide, magnesia, silicon carbide, silicon nitride, beryllia, alumina, boron carbide, silicon, boron, beryllium and carbon fiber.

9. The method of claim 1 wherein step (c) comprises forming the E-block body from an alloy having a reinforcement material, wherein the alloy is selected from the group consisting of magnesium, aluminum and zinc, and the reinforcement material is selected from the group consisting of titanium carbide, magnesia, silicon carbide, silicon nitride, beryllia, alumina, titanium boride, aluminum nitride, boron carbide, silicon, boron, beryllium and carbon fiber.

10. The method of claim 1 wherein step (c) comprises forming the actuator E-block into a near net shape.

11. The method of claim 1, further comprising the step of cooling the actuator E-block prior to step (d).

12. A method for creating an actuator E-block for a hard disk drive, comprising:
   (a) fabricating a yoke and a plurality of actuator arms from a solid material;
   (b) inserting the yoke and the actuator arms into a plurality of close-fitting slots in a mold;
   (c) thixotropically forming a material selected from the group consisting of metal, metal-reinforced metal matrix composite (MMC), ceramic-reinforced MMC and silicon-reinforced MMC, into a semi-solid state;
   (d) injecting the material of step (c) into the mold at high pressure to form an E-block body around portions of the yoke and the actuator arms;
   (e) rapidly cooling the E-block body to create an actuator E-block in a near net shape; and then
   (f) removing the actuator E-block from the mold.

13. The method of claim 12, further comprising the steps of casting the material of step (c) into billets prior to step (c).

14. The method of claim 13, further comprising the step of processing the billets into fine pieces prior to step (c).

15. The method of claim 12 wherein the material of step (c) is formed from powders, blended, hot isostatic pressed and extruded into billets.

16. The method of claim 15, further comprising the step of processing the billets into fine pieces prior to step (c).

17. The method of claim 12 wherein step (a) comprises forming the yoke and the actuator arms from a solid material selected from the group consisting of metal, metal-reinforced metal matrix composite (MMC), ceramic-reinforced MMC, silicon-reinforced MMC, carbon-reinforced MMC, glass, ceramic, and ceramic composite.

18. The method of claim 12 wherein step (a) comprises forming the yoke and the actuator arms from a solid metal alloy having a reinforcement material, the metal alloy being selected from the group consisting of aluminum, magnesium and zinc, and the reinforcement material being selected from the group consisting of titanium carbide, magnesia, silicon carbide, silicon nitride, beryllia, alumina, titanium boride, aluminum nitride, boron carbide, silicon, boron, beryllium and carbon fiber.

19. The method of claim 12 wherein step (c) comprises forming the E-block body from an alloy having a reinforcement material, wherein the alloy is selected from the group consisting of magnesium, aluminum and zinc, and the reinforcement material is selected from the group consisting of titanium carbide, magnesia, silicon carbide, silicon nitride, beryllia, alumina, titanium boride, aluminum nitride, boron carbide, silicon, boron, beryllium and carbon fiber.

20. An actuator E-block for a hard disk drive, comprising:
   an E-block body formed from a reinforced metal matrix composite into a near net shape;
   a yoke formed from a solid material and extending perpendicularly from one side of the E-block body;
   a plurality of actuator arms formed from a solid material and extending perpendicularly from the E-block body opposite the yoke.

21. The actuator E-block of claim 20 wherein the solid materials of the yoke and the actuator arms are selected from the group consisting of metal, metal-reinforced metal matrix composite (MMC), ceramic-reinforced MMC, glass, ceramic and ceramic composite.

22. The actuator E-block of claim 20 wherein the solid materials of the yoke and the actuator arms are a metal matrix composite (MMC) having a matrix and a reinforcement material, the matrix being selected from the group consisting of aluminum, magnesium and zinc, and the reinforcement material being selected from the group consisting of titanium carbide, magnesia, silicon carbide, silicon nitride, beryllia, alumina, titanium boride, aluminum nitride, boron carbide, silicon, boron, beryllium and carbon fiber.

23. The actuator E-block of claim 20 wherein the E-block body is formed from a metal matrix composite (MMC) having a matrix and a reinforcement material, wherein the matrix is selected from the group consisting of magnesium and aluminum, and the reinforcement material is selected from the group consisting of titanium carbide, magnesia, silicon carbide, silicon nitride, beryllia, alumina, titanium boride, aluminum nitride, boron carbide, silicon, boron, beryllium and carbon fiber.

24. The actuator E-block of claim 20 wherein the E-block body is formed from an alloy selected from the group consisting of magnesium and aluminum.

* * * * *